(12) United States Patent
Richman

(10) Patent No.: US 6,573,505 B2
(45) Date of Patent: Jun. 3, 2003

(54) DETECTOR ARRAY STRUCTURE FOR ELIMINATING CHANNEL SPECTRUM

(75) Inventor: Isaac Richman, Newport Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/873,813

(22) Filed: Jun. 4, 2001

(65) Prior Publication Data

US 2002/0179839 A1 Dec. 5, 2002

(51) Int. Cl.[7] .......................... G01J 5/06; H01L 27/14; H01L 31/02
(52) U.S. Cl. .................. 250/338.4; 250/353; 250/332; 257/432; 438/72
(58) Field of Search ........................ 250/338.4, 338.1, 250/336.1, 353, 332; 359/355, 359, 583, 584, 601, 602, 606, 613, 627, 629, 634, 638; 257/432, 436; 438/72, 636

(56) References Cited

U.S. PATENT DOCUMENTS

| | | | | |
|---|---|---|---|---|
| 4,210,922 A | * | 7/1980 | Shannon | 250/338.4 |
| 4,885,709 A | * | 12/1989 | Edgar et al. | 250/338.4 |
| 4,994,672 A | | 2/1991 | Cross et al. | |
| 5,013,918 A | | 5/1991 | Choi | |
| 5,136,164 A | | 8/1992 | Hendrick, Jr. | |
| 5,227,648 A | * | 7/1993 | Woo | 250/358.1 |
| 5,258,618 A | | 11/1993 | Noble | |
| 5,264,699 A | | 11/1993 | Barton et al. | |
| 5,291,332 A | * | 3/1994 | Siebert | 257/185 |
| 5,539,577 A | * | 7/1996 | Si et al. | 359/583 |
| 5,602,393 A | | 2/1997 | Gerard | |
| 5,784,507 A | | 7/1998 | Holm-Kennedy et al. | |
| 5,861,626 A | * | 1/1999 | Chandra et al. | 250/338.4 |
| 5,872,655 A | | 2/1999 | Seddon et al. | |
| 5,900,630 A | | 5/1999 | Tang et al. | |

FOREIGN PATENT DOCUMENTS

JP          58180972 A    * 10/1983    ............. G01T/1/24

* cited by examiner

*Primary Examiner*—Constantine Hannaher
*Assistant Examiner*—Albert Gagliardi
(74) *Attorney, Agent, or Firm*—Harness Dickey & Pierce P.L.C.

(57) ABSTRACT

A detector array that eliminates the channel spectrum effect. In one embodiment the detector consists of a charge couple device (CCD) detector having a photoactive layer supported on a wedge-shaped substrate. Incident radiation impinging any of the pixels and passing through the substrate to the wedge-shaped surface thereof is reflected back at an angle away from the pixel from which it passed through. An infrared array and a single element detector each including a wedge-shaped substrate are also disclosed. The detectors do not require costly signal processing equipment and further can be constructed in accordance with well known manufacturing techniques and with little or no additional cost beyond that normally associated with producing such devices.

10 Claims, 2 Drawing Sheets

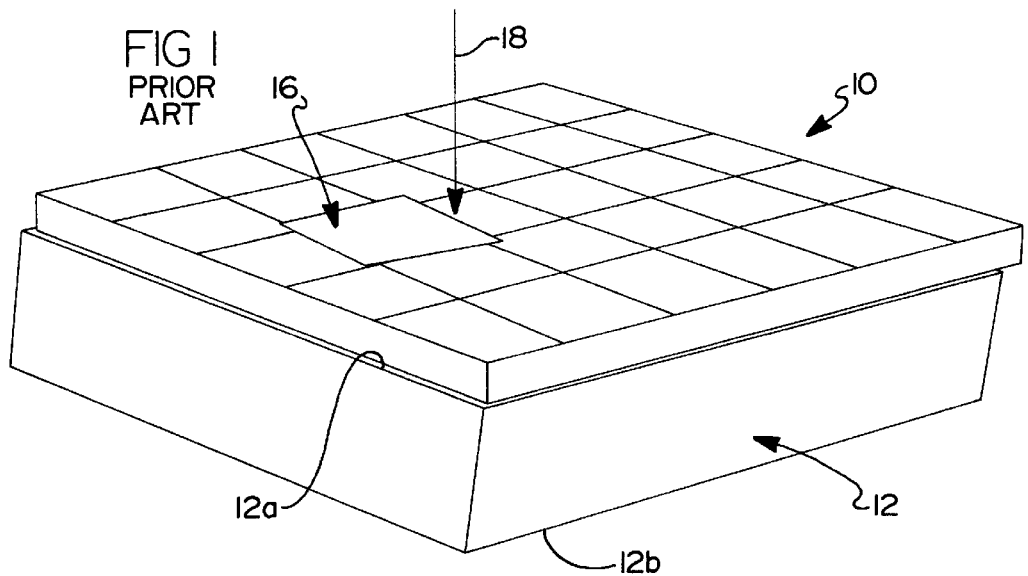
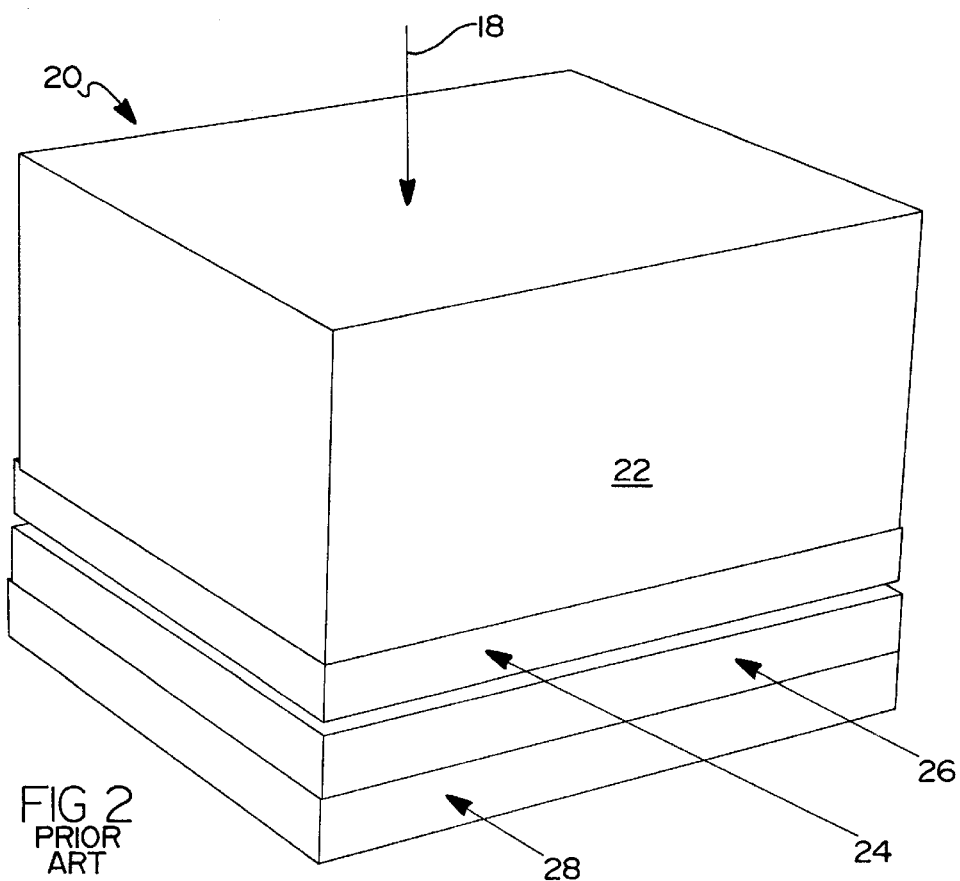

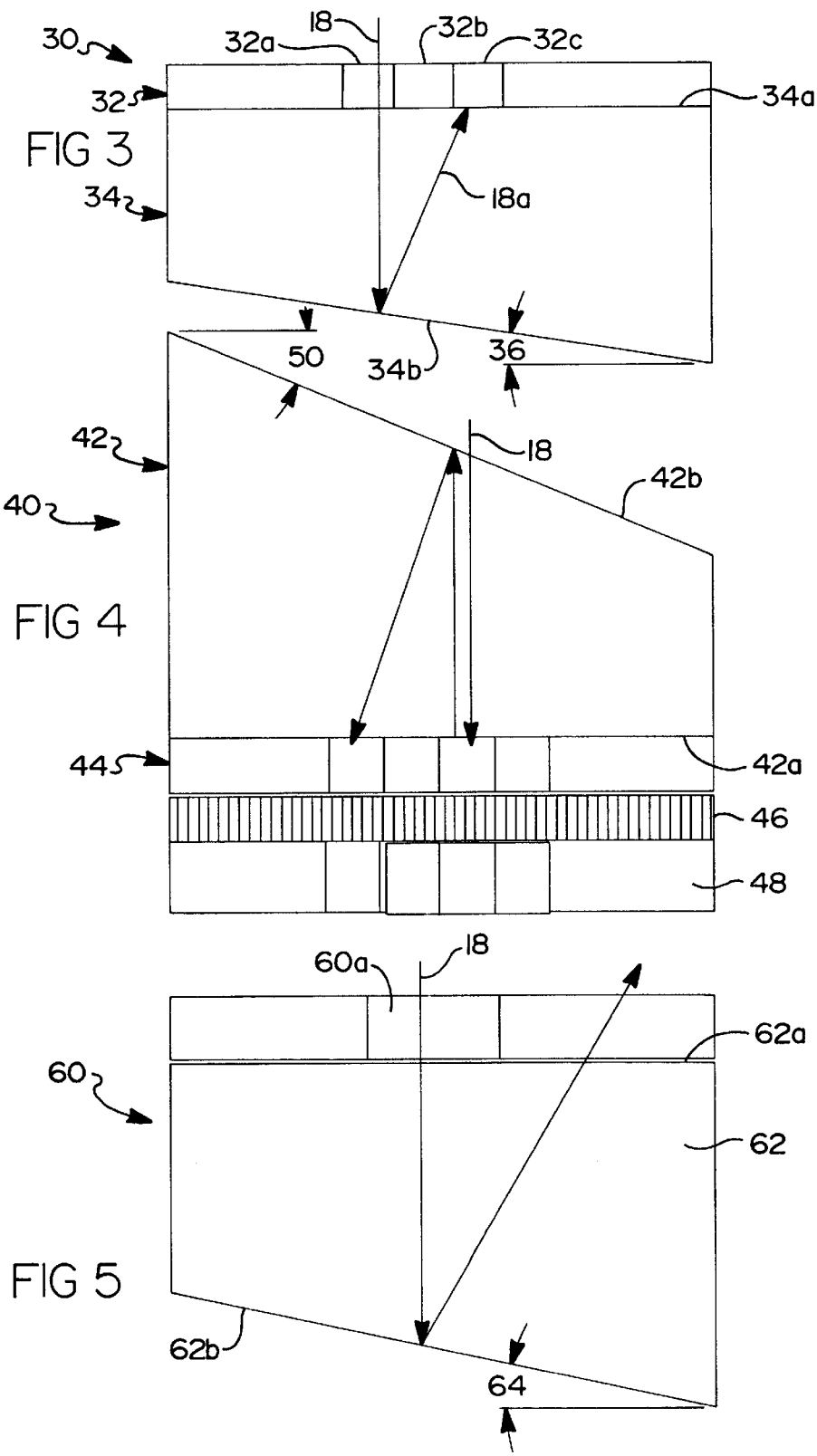

DETECTOR ARRAY STRUCTURE FOR ELIMINATING CHANNEL SPECTRUM

TECHNICAL FIELD

FIG. 5 illustrates a single element photodetector 60 in accordance with yet another alternative preferred embodiment of the present invention. Photodetector 60 includes a single active pixel 60a and a wedge-shaped substrate 62. Again, the substrate 62 has a first surface 62a and a second surface 62b. The substrate 62 is wedge-shaped such that surface 62b extends at an angle represented by arrow 64, preferably at least about 5 degrees, and more preferably about 10 degrees. The incident radiation 18 impinging the single detector element 60a is thus reflected from surface 62b away from detector element 60a, thus preventing the channel spectrum effect.

BACKGROUND OF THE INVENTION

Interferometric spectrometers are now used for hyper-spectral and ultra-spectral imaging of scenes. These scenes may be relatively close to the spectrometer, as in biomedical applications. Alternatively, they may be extremely distant from the spectrometer, as with airborne and spaceborne instruments obtaining data from the Earth and extraterrestrial objects.

There are several types of interferometric spectrometers, including Fourier transform interferometers and tuneable Fabry-Perot Etalons. Interferometric spectrometers are subject to an undesirable artifact referred to as "channeling" or "channel spectrum effect" (see R. Beer, *Remote Sensing by Fourier Transform Spectrometry*, John Wiley and Sons; 1992, and R. J. Bell, *Introductory Fourier Transform Spectroscopy*, Academic Press, 1972). This effect exists in both imaging and non-imaging instruments. The effect produces instrumental artifacts in resulting data output by a detector. Usually these artifacts are such that they cannot be compensated for by careful instrument calibration. Because of this, those sections of data that are corrupted by this artifact are deleted, resulting in a loss of data and system performance degradation.

The channel spectrum effect is attributable to reflections between parallel surfaces within the instrument. In many cases, these parallel surfaces may be eliminated by fairly simple and well known means. Transparent slabs occur as elements of an etalon, or in the beam splitter in a Michelson interferometer. These are typically made wedge-shaped to eliminate the plane parallel surfaces. The detectors used to sense the radiation may be of single element construction or they may consist of an array of elements. Their composition and structure are dependent on the wavelength of the radiation to be sensed. For example, in the infrared regime comprising the wavelength range 1 um to 30 um, there are available individual detectors operating in either the photovoltaic or photoconductive mode, and there are also arrays of elements usually operating in the photovoltaic mode. In an array, each detector element is referred to as a pixel. The detectors typically consist of a thin photoactive layer or layers supported by a substrate. These devices are currently configured as flat slabs with plane parallel faces. Because of the detailed properties of the devices, a portion of the incident radiation is reflected by the surfaces in such a way as to generate a channel spectrum.

SUMMARY OF THE INVENTION

It is therefore a principal object of the present invention to provide an infrared detector array for eliminating the channel spectrum effect.

It is still another object of the present invention to provide a photodetector array that eliminates the channel spectrum effect without the need for complex and expensive electronic signal processing equipment.

It is still another object of the present invention to provide a photodetector array that eliminates the channel spectrum effect, such that only minor modifications are required of the detector array in its construction.

The above and other objects are provided by a photodetector in accordance with preferred embodiments of the present invention. In one preferred embodiment, the photodetector comprises a photoactive layer that is supported on a substrate. The photoactive layer incorporates one or more pixels for receiving incident radiation. The substrate incorporates first and second surfaces, with the photoactive layer being supported on the first surface. The second surface is formed non-parallel to the first surface. More specifically, the entire substrate comprises a "wedge" shaped form. The angle of divergence of the second surface of the substrate from the first surface may vary, but is preferably at least about five degrees, and more preferably about ten degrees. The optimum angle is dependent on detector element size, substrate material and thickness.

In the preferred embodiments, incident radiation passing through the pixel or pixels is reflected at the second surface of the substrate. The incident radiation is reflected such that it does not return towards the pixel through which it has passed, but rather is reflected away from the pixel through which it has just passed. In the first embodiment, the incident radiation passes through the pixel and is reflected by the second surface of the substrate away from the pixel. In a second embodiment, the incident radiation first passes through the second surface of the substrate before impinging the pixel (or pixels), and is reflected back towards the second surface of the substrate. The second surface is formed non-parallel to the first surface such that the incident radiation is further reflected by the second surface away from the pixel from which it was reflected.

The preferred embodiments allow the undesirable channel spectrum effect to be eliminated without the need for complicated electronic signal processing equipment or costly modifications to photodetector structures. The photodetector of the present invention further can be manufactured without significantly increasing the complexity of the manufacturing process or adding appreciably to the overall size of the detector structure.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a prior art charge coupled device (CCD) detector configuration;

FIG. 2 is a perspective view of a prior art infrared detector configuration;

FIG. 3 is a side view of a CCD detector array illustrating how the incident radiation is reflected at the wedge-shaped surface of the substrate away from the pixel through which it has previously passed;

FIG. 4 is a side view of a single element infrared detector in accordance with an alternative preferred embodiment of the present invention illustrating how the incident radiation is reflected away from the pixel from which it has previously passed through; and FIG. 5 is a side view of a single element detector illustrating how incident radiation passing through the active pixel is reflected by the wedge-shaped surface away from the active pixel.

DETAILED DESCRIPTION OF THE PREFERRED EMBODIMENTS

Referring to FIG. 1, a prior art charge coupled device (CCD) photodetector 10 is illustrated. The photodetector 10 includes a substrate 12, typically formed of silicon, and a photoactive layer 14 supported thereon. It will be appreciated that the substrate 12 could be formed from other materials to meet the needs of a specific application.

The photoactive layer typically incorporates anti-reflection and passivating coatings, and includes one or more pixels 16. Incident radiation 18 impinges the pixel 16 and passes therethrough. This incident radiation 18 may be reflected at either a first surface 12a or a second surface 12b of substrate 12 directly back into the pixel 16 through which it just passed. This effect is known as the "channel spectrum" effect. The channel spectrum effect produces an artifact which corrupts the data produced by the photo detector 10.

FIG. 2 illustrates a typical prior art, infrared detector configuration 20. The detector 20 includes a substrate 22, typically formed of cadmium zinc telluride or alumina. that typically incorporates anti-reflection layers formed thereon. It will be appreciated that the substrate 22 could be formed from other materials to meet the needs of a specific application. The photoactive layer 24 is formed on or bonded to the substrate 22. A bump bond layer 26 is used to secure a readout integrated circuit layer 28 to the photoactive layer 24. Similar to the detector 10, incident radiation 18 can be reflected after striking the photoactive layer 24 such that it is redirected back onto the same pixel of the photoactive layer 24, thus creating the channel spectrum effect.

Referring now to FIG. 3, a detector 30 in accordance with a preferred embodiment of the present invention is illustrated. The detector 30, in this embodiment, comprises a charge coupled device (CCD) having a photoactive layer 32 and a substrate 34. The photoactive layer 32 includes a plurality of pixels 32a, 32b and 32c, each of which can receive incident radiation thereon. The substrate 34 is also preferably made from silicon, or other suitable materials.

It is a principal advantage of the detector 30 of the present invention that a first surface 34a and a second surface 34b of the substrate 34 do not extend parallel to one another. Rather, the substrate 34 forms a wedge-shaped portion. Preferably, the angle of surface 34b relative to a line extending parallel to surface 34a, as designated by arrow 36, comprises an angle of at least about 5 degrees, and more preferably about 10 degrees. Because of this angle, the incident radiation 18 impinging any of the pixels 32a, 32b or 32c, will be reflected from the second surface 34b at an angle, as indicated by arrow 18a. Thus, by deflecting the incident radiation away from the pixel 32a, 32b or 32c, the channel spectrum effect is eliminated. It will be appreciated that the optimum angle (indicated by angle 36) in this embodiment and the subsequently described preferred embodiments is dependent on the detector element (i.e., pixels 32a, 32b, 32c, etc.), substrate 34 material, thickness, and the interferometer optical configuration. An angle of about 10 degrees has been found to be preferred for a detector having elements of about 45 micrometers, for a substrate having a thickness of about one millimeter, and for an f-cone of about f/4.

Referring to FIG. 4, an alternative preferred embodiment of the detector of the present invention is illustrated. This embodiment comprises an infrared detector array 40 having a substrate 42 with a first surface 42a and a second surface 42b. A photoactive layer 44 is secured to surface 42a of the substrate 42, and a bump bond layer 46 is used to secure a read out integrated circuit layer 48 to the photoactive layer 44. The difference between the detector 40 and the detector 30 is that the surface 42b of the substrate 42 is wedge-shaped. Again, the angle of the surface 42b relative to the surface 42a, as indicated by arrow 50, is preferably at least about 5 degrees, and more preferably about 10 degrees. Thus, the incident radiation 18 which passes through the substrate 42 and impinges the photoactive layer 44 cannot be reflected by surface 42b directly back onto the very same pixel which it previously impinged. The angle of surface 42b causes a reflected incident radiation to be directed away from the pixel from which it came.

FIG. 5 illustrates a single element photodetector 60 in accordance with yet another alternative preferred embodiment of the present invention. Photodetector 60 includes a single active pixel 60a and a wedge-shaped substrate 62. Again, the substrate 62 has a first surface 62 and a second surface 62b. The substrate 62 is wedge-shaped such that surface 62b extends at an angle represented by arrow 64, preferably at least about 5 degrees, and more preferably about 10 degrees. The incident radiation 18 impinging the single detector element 60a is thus reflected from surface 62b away from detector element 60a, thus preventing the channel spectrum effect.

Producing a wedge-shaped substrate on conventional CCD detectors can be difficult because their substrates are typically quite thin. They can, however, be made much thicker to permit the wedge fabrication described herein. Thinned CCD arrays are also commercially available. However, it is anticipated that the manufacture of thinned CCD arrays may be more difficult than manufacturing detectors having a wedge-shaped substrate.

The present invention in its various embodiments results in improved performance and simpler signal processing for many of the instruments used in hyper-spectral and ultra-spectral imaging. Such imaging is used for a variety of Earth monitoring activities, both commercial and military. Detectors in accordance with the present invention will also likely find utility in various satellite applications where one or more satellites employ spectral imaging to provide useful information. Hyper-spectral and ultra-spectral imaging are also being used in various process industries including the chemical and petrochemical industries. Single element detectors in accordance with the present invention are anticipated to have equally numerous applications with instruments used for imaging.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A photodetector apparatus for eliminating an unwanted channel spectrum effect in data generated by the apparatus, comprising:
   a photoactive layer comprising at least one detector element for receiving incident radiation thereon;
   a substrate for supporting said photoactive layer, and having a first surface and a second surface, said first surface being disposed against said photoactive layer; and said second surface being formed so as to be non-parallel to said first surface, thereby preventing said incident radiation impinging said detector element from being reflected directly back along its propagation path into said one detector element.

2. The apparatus of claim 1, wherein said second surface is formed at an angle of about five degrees relative to said first surface.

3. The apparatus of claim 1, wherein said second surface is formed at an angle of about ten degrees relative to said first surface.

4. The apparatus of claim 1, wherein said photoactive layer comprises first and second planar surfaces formed generally parallel to one another; and wherein said second surface of the substrate is formed at an angle of about ten degrees relative to said first and second surfaces of said photoactive layer.

5. A photodetector apparatus for eliminating an unwanted channel spectrum effect in data generated by the apparatus, comprising:

a photoactive layer comprising at least one detector element for receiving incident radiation thereon;

a substrate for supporting said photoactive layer, said substrate having first and second surfaces, said first surface being disposed adjacent to said photoactive layer; and said second surface being formed at an angle of at least about five degrees relative to said first surface.

6. The apparatus of claim 5, wherein said second surface is formed at an angle of between about five to fifteen degrees relative to said first surface.

7. The apparatus of claim 5, wherein said second surface is formed at an angle of about ten degrees relative to said first surface.

8. A method for forming a photodetector which is not susceptible to a channel spectrum effect during operation, said method comprising the steps of:

using a photoactive layer having at least one photodetector element to receive incident radiation thereon; and supporting said photoactive layer with a substrate slab having non-parallel surfaces, such that any portion of said incident radiation impinging and reflected from said substrate slab is not reflected directly back into said one photodetector element.

9. The method of claim 8, wherein said step of supporting said photoactive layer with said substrate slab comprises forming said substrate slab such that one of said surfaces thereof extends at an angle of at least about five degrees relative to the other one of said surfaces.

10. The method of claim 8, wherein said step of forming said substrate slab comprises the step of forming said surfaces such that one extends at an angle of about ten degrees relative to the other one of said surfaces.

* * * * *

UNITED STATES PATENT AND TRADEMARK OFFICE
CERTIFICATE OF CORRECTION

PATENT NO.    : 6,573,505 B2
DATED         : June 3, 2003
INVENTOR(S)   : Richman, Isaac It is certified that error appears in the above-identified patent and that said Letters Patent is hereby corrected as shown below:

Column 1,
Line 5, the following paragraph should appear under "TECHNICAL FIELD"
-- This invention relates to infrared detector arrays, and more particularly to a detector array structure constructed so as to eliminate the effect of channel spectrum to thereby produce a greater quantity of useable data from the detector array. --
Line 5, the following paragraph, which presently appears under "TECHNICAL FIELD", should be moved to the last paragraph before "DETAILED DESCRIPTION OF THE PREFERRED EMBODIMENTS" and should read as follows: -- Figure 5 illustrates a single element photodetector 60 in accordance with yet another alternative preferred embodiment of the present invention. Photodetector 60 includes a single active pixel 60a and a wedge-shaped substrate 62. Again, the substrate 62 has a first surface 62a and a second surface 62b. The substrate 62 is wedge-shaped such that surface 62b extends at an angle represented by arrow 64, preferably at least about 5 degrees, and more preferably about 10 degrees. The incident radiation 18 impinging the single detector element 60a is thus reflected from surface 62b away from detector element 60a, thus preventing the channel spectrum effect. --

Signed and Sealed this

Twenty-third Day of March, 2004

JON W. DUDAS
*Acting Director of the United States Patent and Trademark Office*